United States Patent

[11] 3,574,273

| [72] | Inventor | Richard G. Hilbert<br>Esmond, R.I. |
|---|---|---|
| [21] | Appl. No. | 823,027 |
| [22] | Filed | May 8, 1969 |
| [45] | Patented | Apr. 13, 1971 |
| [73] | Assignee | Leesona Corporation<br>Warwick, R.I. |

[54] FALSE TWIST SPINDLE AND METHOD OF THREADING THE SAME
18 Claims, 25 Drawing Figs.

[52] U.S. Cl. .................................................... 57/77.3,
 57/77.33, 57/156
[51] Int. Cl. .................................................... D02g 1/04,
 D01h 7/92
[50] Field of Search ......................................... 57/51.5,
 77.3, 77.33, 77.45, 156

[56] References Cited
UNITED STATES PATENTS

| 3,091,910 | 6/1963 | Steele ............................ | 57/77.33 |
| 3,475,895 | 11/1969 | Raschle ......................... | 57/77.3 |
| 3,488,937 | 1/1970 | Duquette ....................... | 57/77.45 |

FOREIGN PATENTS

| 894,845 | 4/1962 | Great Britain ................ | 57/77.3 |

*Primary Examiner*—Donald E. Watkins
*Attorney*—Shaffert and Miller

ABSTRACT: Disclosed is a spindle blade for a false twist spindle characterized by a unitary element blade and a twist trapping pin that is mounted on one end of the spindle blade. The pin is located within the bore in the blade and the wall of the tube is characterized by the absence of any apertures therethrough. The blade is able to withstand rotational forces generated by a very high speed of rotation. Due to the enclosed position of the pin it is necessary to provide a method for threading the false twist spindle and such a method is also disclosed.

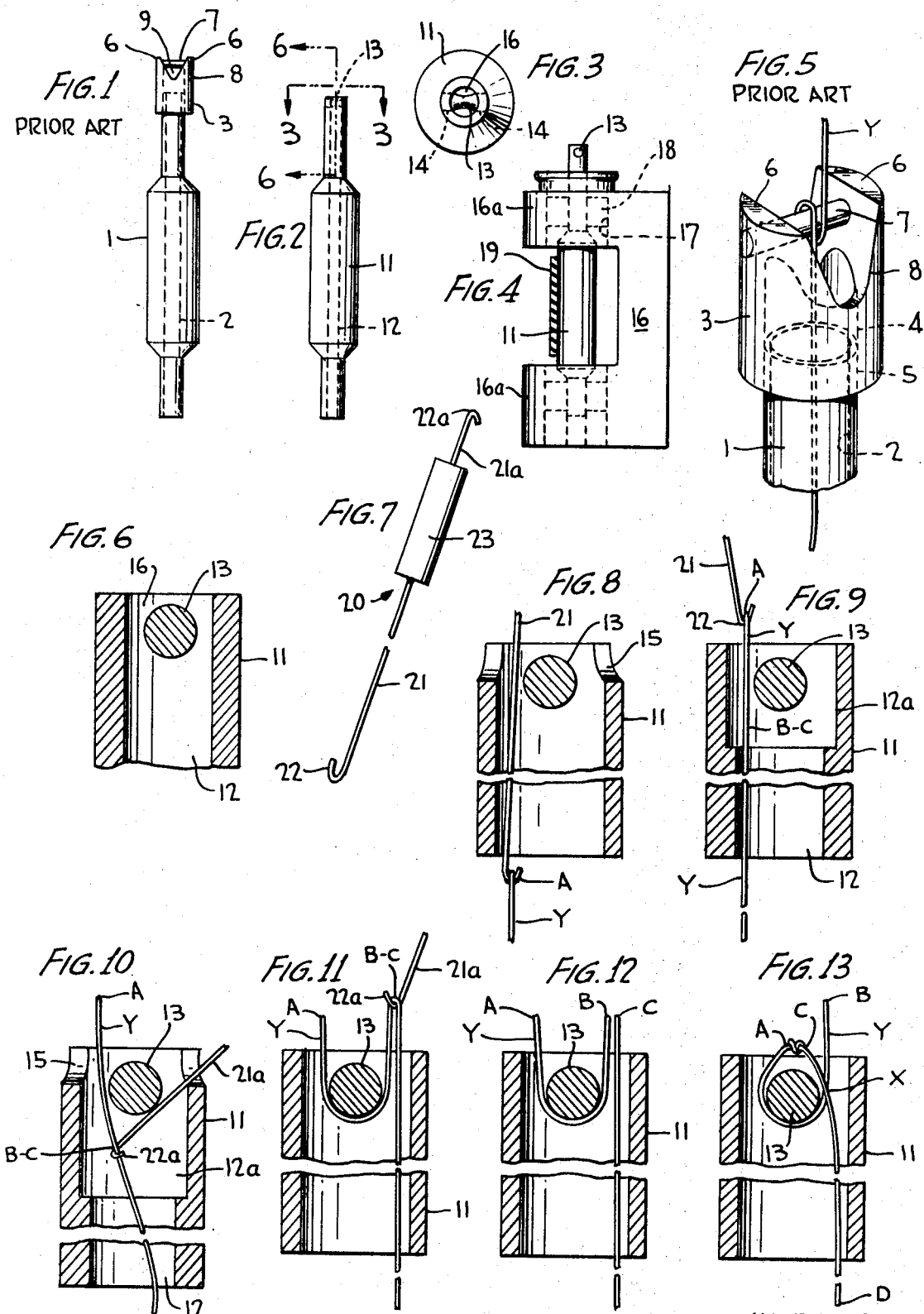

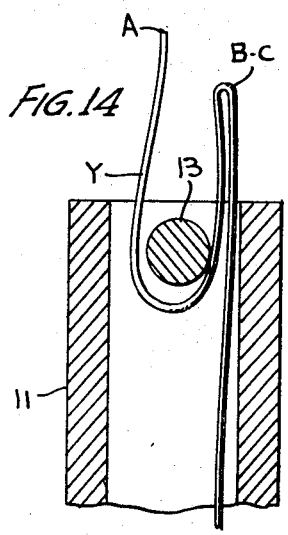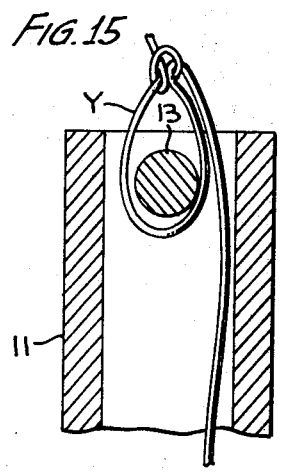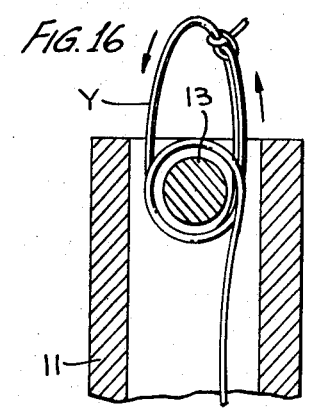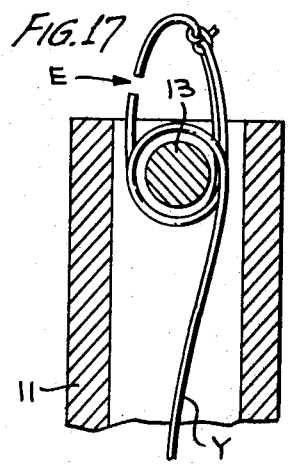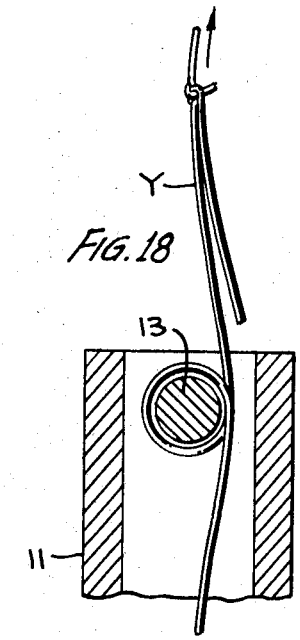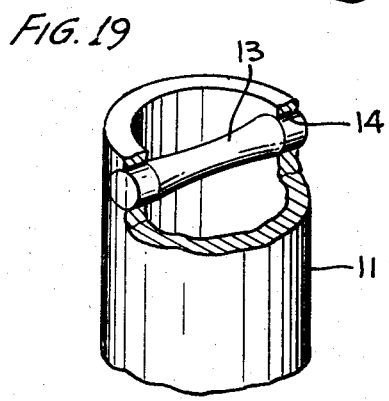

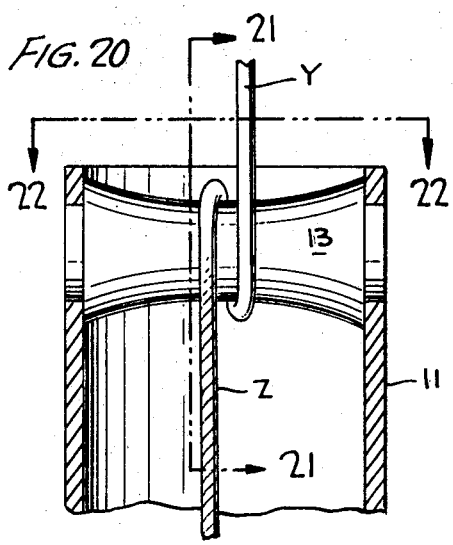
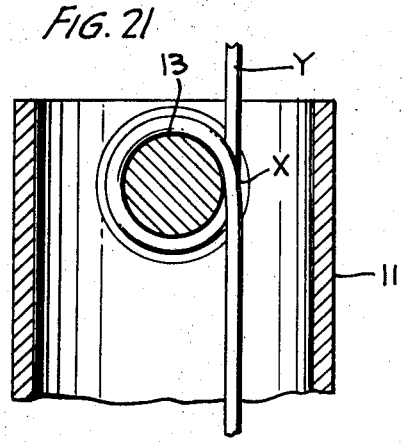
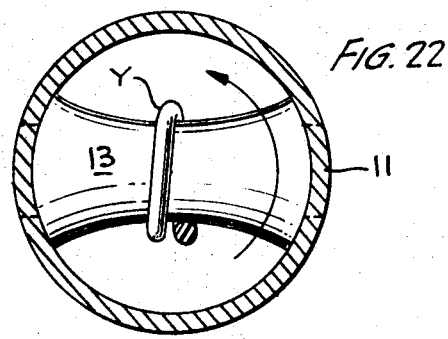
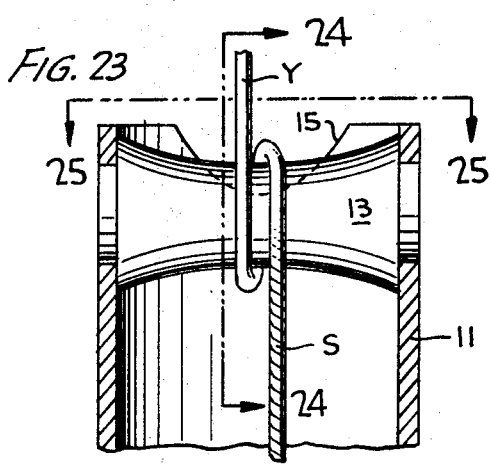
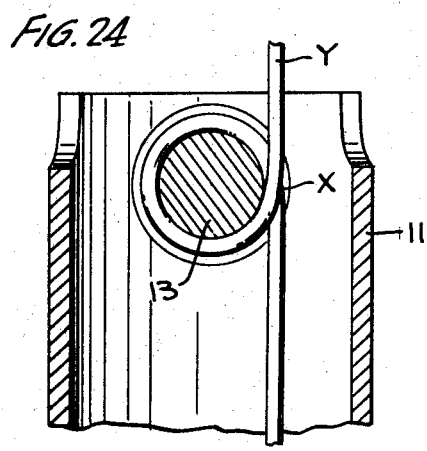
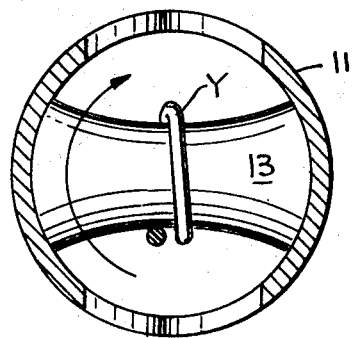

FALSE TWIST SPINDLE AND METHOD OF THREADING THE SAME

BACKGROUND OF THE INVENTION

Field of the Invention

The present invention relates to textile machinery and is directed more particularly to a machine for imparting false twist to a strand of yarn and a method of threading said machine. In recent years, much attention has been given by the textile art to the so-called "crimped" synthetic yarns. As is well known, these yarns have been mechanically treated to assume a crimped or coillike configuration so that they have a certain inherent elasticity and bulkiness that distinguishes them from untreated yarns. These properties cause them to be highly desirable for certain applications in which they have encountered unusual consumer acceptance.

A variety of techniques have been proposed for imparting a crimped structure to synthetic yarns and at the present time one of these techniques involves twisting the yarn, setting the twist, and untwisting the set yarn in a continuous operation without interruption between the individual steps. The continuous twisting and untwisting is accomplished by passing the yarn through a rotating body having twist trapping means for engaging the yarn to prevent free twist migration, rotation of the body imparting twist in one direction in the yarn on one side of the body and twist in the opposite direction on the other side thereof. Thus, an apparent or temporary twist is inserted in the yarn and is immediately removed therefrom as the yarn travels past the body. Spindles adapted for this operation have come to be known as "false twist" spindles in contrast to "true twist" spindles which rotate either the delivery or takeup yarn packages.

It is quite apparent that as the speed of rotation of the false twist spindle is increased, either a higher number of turns per inch of temporary twist is imparted to the yarn, or else the yarn can be given the same number of turns per inch while passing through the spindle at a higher linear speed. Recognizing this, workers in the art have attempted in various ways to effect a material increase in the speed of rotation of false twist spindles. The false twist spindle disclosed herein is capable of very high rotational speeds, as for example 500,000 or 600,000 r.p.m.

The most common false twist spindle employed at the present time is a machine comprising a tube with an axial bore therethrough, mounted for rotation in a housing shaped like a block letter "C." The tube, or as commonly known in the art, the blade, is mounted at both ends and is driven by a driving belt that is moved in contact with the surface of the midsection of the hollow tube. The term blade is understood in the art to mean a generally cylindrical element with a longitudinal bore therethrough. Prior art blades have generally been an assembly of elements rigidly fixed to each other consisting of a hollow tube and a twist trapping means attached to said tube. In a common prior art false twist spindle a twist trapping pin is mounted at one end of the tube and is positioned transverse to the axial bore through the tube. It is about this pin that the yarn to be twisted is wrapped, and the pin serves as the element that carries the yarn and assures that the yarn will be rotated or twisted as the spindle tube itself rotates. The wrapping or looping of the yarn around the pin is an operation that must be performed each time a new supply creel of yarn is placed on the continuous process machine or each time that the yarn breaks. As such, it is necessary for an operator to have easy access to the pin so that the wrapping of the yarn thereabout may be performed expeditiously. This requirement has been met in the past by mounting the pin at the end of the spindle with sufficient clearance around the pin to allow the insertion of a threading tool beneath the pin. The mounting providing such clearance has typically taken the form of a small, hollow cylindrical member with two upstanding ears on one axial end thereof. This mounting member is mounted on the end of the hollow spindle tube such that the axial bore of the spindle is aligned with the bore through the hollow mounting member. The twist trapping pin is mounted transverse to the bore with one end of the pin mounted on each of the ears. The ears are of sufficient length such that mounting the pin at the extremity of the ears allows the passage of a fine wire hook beneath the pin.

In place of upstanding ears on the end of the hollow tube, other devices have been proposed in the past. As an example, with a pin mounted in an earless tube, a hole has been drilled on a diameter of the tube in a zone on the wall of the tube that is defined as being between two planes passing through the surface of the pin and transverse to the bore, with one plane passing through the side of the pin facing the downstream end of the tube and the second plane passing through the side of the pin facing the upstream side of the tube. This hole provides access to the pin to loop the yarn around the pin.

The false twist spindles just described have served well in the past, but increased production demands have required that the speed of the revolution of the false twist spindle be increased, and in so doing, the spindle ceases to function in a dependable and consistent manner. Specifically, as the speed is increased, as for example to 500,000 to 600,000 r.p.m., the upstanding ears of the first mentioned pin mount are adversely affected by the centrifugal forces acting thereon and manufacturing eccentricities in the relatively large pin mount. As each ear is supported at only one of its ends, at the pint where it joins the small cylindrical mounting member, it has insufficient strength to withstand the forces acting thereupon. Extreme vibrations or oscillations occur and the ultimate result is loosening or fracture of the pin at the pint where the end of the pin is attached to the ear or the breakage of one of the ears. Such a fracture or breakage results in extreme unbalance of the rotating tube, with further destruction of the spindle as the ultimate result.

With similar speeds, that is 500,000 or 600,000 r.p.m., the second mentioned spindle is also adversely affected by the centrifugal forces acting thereon. From a practical manufacturing standpoint, it is very difficult to form the threading hole below the pin such that is passes exactly through a diameter of the tube. As such, an eccentric hole will exist and cause destructive unbalance when the spindle is rotated at high speeds. It is readily apparent that destruction as described with reference to both the above spindles renders the false twist spindle useless for its intended purpose and causes serious production problems in the continuous processing of the yarn.

SUMMARY OF THE INVENTION

The false twist spindle blade disclosed herein overcomes the problems discussed above. In the instant invention, the blade is a single element or unitary element with the twist trapping pin mounted directly to the wall of the blade. The pin is mounted at the downstream or output end of the blade. The wall of the blade is unpunctured or characterized by the complete absence of apertures or holes through the wall in a region defined between the upstream end of the blade and an imaginary plane passing transverse to the longitudinal axis of the blade and through the centerline of the twist trapping pin. In this invention the mounting of the pin on the tube is facilitated by the expedient of two small holes drilled 180° apart through the wall of the spindle tube end. The ends of the pin are then fixedly mounted in the holes. The purpose of the upstanding ears or the threading hole on the prior art spindles is to provide a space for the insertion of the threading tool under the pin. The dimensioning of the ears necessary to provide a space for the tool, or the eccentricity of the threading hole, has the drawback discussed above. It is, of course, apparent that the mounting of the pin in the invention here disclosed does not provide for a space for the tool to be inserted under the pin as the wall of the blade is unbroken in the aforedefined region. Such a space could be provided by cutting away a portion of the spindle tube itself, but in effect, this would produce unsupported mounting ears or an eccentric threading hole and result in the same problems that are inherent in the prior art spindles.

It is apparent that if the strength of the tube end is to be retained in the instant invention by eliminating the construction that provides the unsupported ears or the hole, an alternate method to thread the spindle must be provided, as there is no space for the insertion of the tool under the pin in a direction transverse to the axial bore.

Such a method is here disclosed. Although there is no space for the transverse insertion of the tool under the pin, there is, of course, clearance on both sides of the pin between the pin and the inside surface of the bore in the tube. This side clearance allows a tool to be inserted on either side of the pin and passed axially through the bore in the tube. Briefly, the method here disclosed comprises pulling a first end of a strand of yarn through the bore and then pulling a loop of the same strand through the bore such that the loop is on the other side of the pin. The loop is then cut, and a specific one of the cut ends is tied to the first end on the other side of the pin. Variations in the location of the knot determine whether the twist imparted to the yarn will be "Z" twist or "S" twist, in a manner to be subsequently described in greater detail. A very small knot is used as the knot must be small enough to pass through the side clearance. The remaining free end of the cut loop is now ready to be fastened to an appropriate takeup package and as this end is pulled away from the spindle, the knotted ends glide around the pin as a continuous loop. The spindle is now threaded and ready for use. An alternative method is disclosed for the threading the spindle when it is desired to wrap the yarn a plurality of times around the pin.

An object of the present invention is to provide a false twist spindle that enables a continuous process for the texturing of yarn to be performed at a greatly increased rate than hitherto possible.

Another object of the present invention is to provide a false twist machine of simple construction that is capable of very high speed operation.

A still further object of the present invention is to provide a method for threading the improved false twist spindle disclosed herein.

BRIEF DESCRIPTION OF THE DRAWINGS

FIG. 1 is an elevation view of the hollow tube and related parts of a prior art false twist spindle.

FIG. 2 is an elevation view of the hollow tube and related parts of the false twist spindle of the instant invention.

FIG. 3 is a top view of the hollow tube taken along line 3-3 of FIG. 2.

FIG. 4 is an elevation view of the false twist spindle of the instant invention, showing the essential parts as assembled.

FIG. 5 is an isometric view of the pin mounting member of a prior art false twist spindle with a portion of the hollow tube, illustrating the manner in which the strand of yarn is threaded around the pin.

FIG. 6 is a cross-sectional view taken along line 6-6 of FIG. 2 of the instant invention, showing the end of the hollow tube and pin mounted therein. The view is greatly enlarged for illustration of the method of threading.

FIG. 7 is a schematic representation of the threading tool employed with the instant invention.

FIGS. 8—13 are cross-sectional views of the tube end of the instant invention, similar to the view shown in FIG. 6 but sequentially illustrating the steps performed in the method of threading the false twist spindle.

FIGS. 14—18 are cross-sectional views of the tube end of the instant invention, similar to the view shown in FIG. 6, and sequentially illustrating the steps performed in a modification of the method to thread the false twist spindle.

FIG. 19 is an isometric view of the pin, hollow tube and pin mounting of the instant invention, greatly enlarged for clarity.

FIG. 20 is a view of the pin of the instant invention with the tube shown in section. The strand of yarn is shown looped about the pin in a manner to produce a "Z" twist in the textured yarn.

FIG. 21 is a sectional view taken on line 21-21 of FIG. 20.

FIG. 22 is a top view of the pin end of the tube, taken on line 22-22 of FIG. 20.

FIG. 23 is a view similar to FIG. 20, but the strand of yarn is shown looped around the pin in a manner to produce a "S" twist in the textured yarn.

FIG. 24 is a sectional view taken along line 24-24 of FIG. 23.

FIG. 25 is a top view of the pin end of the tube, taken on line 25-25 of FIG. 23.

DESCRIPTION OF A PREFERRED EMBODIMENT OF THE APPARATUS AND A PREFERRED PERFORMANCE OF THE METHOD

With particular reference to FIGS. 1 and 5, the prior art false twist spindle tube and pin mounting will be described. FIG. 1 shows the general cylindrical hollow tube 1, with the ends thereof of smaller diameter than the midsection, with axial bore 2 therethrough. Mounted on one end of tube 1 is a generally cylindrical hollow pin mounting member 3 with axial bore 4 therethrough (FIG. 5). Mounting member 3 is telescopically mounted at 5 on the end of tube 1. At the other end of mounting member 3 are two upstanding ears 6 which serve as the mounting or support elements for pin 7. Pin 7 is formed of a very hard material to withstand the abrasive action of the yarn passing therearound, and is cemented or otherwise fixedly attached to ears 6 in a hole drilled in each ear. Pin 7 is of generally circular cross section. Upstanding ears 6 form between them a groove 8 and the space 9 defined between ears 6, groove 8 and pin 7 is a tool receiving space necessary to thread up the device.

The false twist spindle of the instant invention will now be described, with particular reference to FIGS. 2, 3, 4, and 19. FIG. 2 shows a generally cylindrical hollow tube 11, with the ends thereof of smaller outer diameter than the midsection, with axial bore 12 therethrough. One end of tube 11 has mounted therein pin 13. Pin 13 is of a generally circular cross section and is generally cylindrical in shape. As seen in FIGS. 3 and 19, the midsection of pin 13 may be slightly constricted, as shown, in order to keep the loop of yarn wrapped thereabout centered on the pin. As in the prior art spindle, the pin is formed of a very hard material. The pin is cemented or fixedly attached to the tube by mounting the ends of the pin in two holes 14 (FIG. 19) drilled 180° apart through the wall of the tube. As is visible in FIG. 19, the pin is located within the end surface of the tube end, that is, between the two ends of the tube. If desired, a metal band may be press fit around the tube in the area of the pin to facilitate the attachment of the pin to the tube.

A small notch 15 may be cut in the end surface of the downstream end of the tube on each side of the pin (FIGS. 8 and 23) although it is to be emphasized that these notches are not deep enough to expose the undersurface of the pin. The depth of the notch may be, for example, equal to or somewhat less than the distance from the end surface of the tube to the centerline of the pin, so that, at most, the top half of the pin is exposed to view. The notches merely serve to act as a guide when a threading tool is inserted axially into the axial bore 12 through tool space 16 (FIG. 3). As is readily apparent, the shallow notches do not provide a space to insert the tool beneath the pin in a direction perpendicular to the axis of the tube. To form the notches with sufficient depth to provide such a space would defeat the structural advantages of the instant invention, and would, in effect, form ears similar in some respects to ears 6 of the prior art spindle in FIGS. 1 and 5. If such ears existed, some of the previously discussed disadvantages of such a structure would be equally applicable to the false twist spindle here discussed. As the notches 15 are very shallow, however, the entire circumference of the end of the tube forms an unbroken supporting mount for pin 13. It is to be emphasized that these notches are not essential to the operation of the instant invention.

A counterbore 12a (FIG. 9) may be provided in the end of tube 11. Such a counterbore, though not necessary for the operation of the instant invention, may facilitate the insertion of a tool to thread the spindle.

It desired, both a counterbore 12a and notches 15 may be provided in the end of tube 11 (FIG. 10) and the combination of both may further facilitate the insertion of a tool to thread the spindle.

The tube structures here discussed have sufficient strength to withstand the destructive vibrations characteristic of the prior art spindles and may be run at a much higher rotary speed. It is presently contemplated that the spindle of this invention will be placed in operation with a speed of as high as 500,000 to 600,000 r.p.m., although it is to be understood that these speeds are not considered to be the maximum speeds that the spindle is capable of withstanding.

The following dimensions are given as merely an example of an embodiment of the hollow tube and pin of the instant invention. The length of the hollow tube may be 1 23/32 inches long, with the large outside diameter midsection having a length of 0.950 inch and the smaller outside diameter end of the tube with the pin being 0.500 inch long. The outside diameter of the smaller pin end of the tube may be 0.094 inch and the outside diameter of the large midsection may be 0.150 inch. The diameter of the axial bore through the tube may be 0.050 inch. The length of the twist trapping pin is on the order of three thirty-seconds inch long and the diameter of the pin where it is fastened to the tube may be 0.040 inch. As aforementioned, the pin may be constricted to a lesser diameter in its central area to produce a side clearance width of about 0.015 inch between the side of the pin and the inside surface of the axial bore through the tube. It is noted that the wire diameter of the hook or threading tool is of the order of 0.010 inch, which is small enough to pass through the side clearance. The distance from the end surface of the tube to the axial centerline of the pin may be 0.031 inch and, if notches are provided, the depth of the notches cut into the end of the tube to act as a guide for the tool may be the same, i.e., 0.031 inch. As aforementioned, to further facilitate the insertion of the tool, the axial bore of the tube may be counterbored in the area of the pin to a depth of about three sixty-fourths inch and a diameter of about one-sixteenth inch.

FIG. 4 illustrates the assembled false twist spindle in the instant invention with the tube 11 of FIG. 2 mounted in a block letter C-shaped housing 16. At the ends of both arms 16a of the housing are bearing bores 17 with bearings 18 placed therein. Spindle 11 is rotatably mounted such that the smaller diameter ends of the spindle pass through bearings 18. Bearing 18 must be of a type capable of withstanding very high rotational speeds, although it is to be understood that the specific bearings employed do not constitute a part of this invention. An example of a bearing suitable for use in the instant invention is given in my U.S. Pat. No. 3,044,247, issued Jul. 17, 1962, although it is understood that the instant invention is not limited to the use of such a bearing.

A belt 19, shown in cross section in FIG. 4 is in contact with the midsection of spindle 11 and is the driving element to rotate the spindle about an axis passing longitudinally through the spindle. It is to be noted that the spindle tube mount 16 as illustrated in FIG. 4 is the same or similar to the mount used with the prior art tube in FIG. 1. FIG. 4, however, shows the hollow tube 11 of the instant invention mounted in the spindle housing.

The false twist assembly shown in FIG. 4 may be mounted on a yarn texturing machine which may include yarn supply means, tensioning devices, twist setting means, takeup means and other yarn handling elements in a manner well known in the art.

The yarn to be processed is passed through the axial bore of the spindle and is looped one or more times around the pin. As previously explained, rotation of the spindle will impart a twist to the yarn, and, as for example, when the yarn passes upwardly through the spindle a twist will be imparted to the yarn below the spindle in the region of the twist setting means and simultaneously removed above the spindle to provide a continuous texturing process.

It is apparent that in order for a strand of yarn to pass through the false twist spindle in the aforedescribed continuous process, the operator must be able to thread the spindle such that the strand will pass through the axial bore and be looped one or more times around the twist trapping pin.

Threading the prior art false twist spindle illustrated in FIGS. 1 and 5 involves the step of inserting a fine wire hook through the axial bore of the tube such that the hook is exposed below the spindle housing, hooking a strand of yarn and drawing same through the axial bore 2 of the tube and axial bore 4 of the pin mounting member. With particular reference to FIG. 5, the orientation of the looped or threaded yarn Y is clearly shown to have been drawn through the bores 2 and 4 and past the front of the pin 7. The next step is to pass this end of the yarn over the top of the pin 7 and toward the back of the mounting member 3 as shown in FIG. 5. The wire hook is the oriented perpendicular to the axis of bore 4 and passed through space 9 from the front to the back of mounting member 3 and the end of strand Y is engaged by the hook. The hook is then pulled back through space 9, carrying the yarn end therewith. The looping or threading operation is now completed. This looping operation may be repeated if it is desired to loop the yarn around the pin a plurality of times. The yarn is now advanced to the takeup package, and the continuous texturing process may begin.

As is clear from the previous description of the false twist spindle of the instant invention, no clearance is provided to pass the tool underneath the entire pin in an orientation perpendicular to the axis of bore 11. As such, an alternative method of threading the device is necessary.

FIG. 6 is a cross-sectional view of the pin end of the tube of the instant invention, showing a portion of tube 11, pin 13, axial bore 12 and side clearance space 16. FIG. 7 is a schematic representation of threading tool 20 which has, on one end of handle 23, a wire 21 of sufficient length to pass through the entire length of the axial bore 12 of tube 11. On the end of wire 21 is a hook 22 that is used to hook or engage the strand of yarn to be threaded through the device. On the other end of handle 23 is wire 21a, which is shorter than wire 21. On the end of wire 21a is a hook 22a that is used to engage the strand of yarn in a manner to be subsequently described.

A method of threading the false twist spindle constitutes a part of this invention and is sequentially shown in FIGS. 8 through 13.

As shown in FIG. 8, the hook 22 is passed through one side clearance space 16 and through the axial bore 12 until the hook is exposed at the other end of tube 11. The end of yarn Y, designated as point A in FIG. 8, is engaged by hook 22.

FIG. 9 illustrates the next step of the method, where the strand of yarn Y is drawn through the bore until end A extends past the pin. The tool is disengaged from the yarn. Point B—C is defined on the yarn at a location below pin 13. Point B–C may be outside tube 11 or, as shown in FIG. 9, may be within tube 11.

As illustrated in FIG. 10, the smaller end of tool 20 is now inserted in the other side clearance space 16 and passed into axial bore 12 until hook 22a is disposed adjacent the underside of pin 13. Hook 22a engages yarn Y at point B–C.

The tool is now drawn back through side clearance 16, as shown in FIG. 11, until the yarn forms a loop with point B–C as the apex. Hook 22a is disengaged from the yarn.

The next step is illustrated in FIG. 12, and consists of cutting yarn Y at point B–C to form two ends. One of said ends is designated as end B and the other as end C. There are now three yarn ends extending past the tube 11 and pin 13. All, of course, must be held or fastened to prevent the ends from slipping back down into the axial bore 12.

FIG. 13 illustrates the next step in the method of threading the spindle. Yarn end C is tied to yarn end A with a knot that is small enough to pass through side clearance 16. As is visible in FIG. 13, yarn Y now completely encircles pin 13, and the false twist spindle is threaded. It is to be understood that the method can be repeated if it is desired to loop the yarn around the pin a plurality of times. It is also understood that the tool may initially be inserted from the other end of tube 11, although as a practical matter, it is more convenient to work from the pin end of the tube.

Another method of threading the false twist spindle constitutes a part of this invention and is sequentially shown in FIGS. 8 through 11 and 14 through 18. This method is of particular use when it is desired to wrap the yarn around pin 13 a plurality of times, though it may be used for a single pass.

The steps previously explained with reference to FIGS. 8 through 11 are repeated for this method, and will not again be described in detail. A comparison of FIG. 11 and FIG. 14 discloses the yarn Y is looped around the pin in a similar manner. As shown in FIg. 14, hook 22a is disengaged from point B–C.

After disengaging hook 22a from yarn Y, the next step, illustrated in FIG. 15, consists of typing end A of yarn Y to uncut end B–C of yarn Y. It is to be emphasized that the yarn is not cut at point B–C. Yarn Y now forms a loop about pin 13.

The next step, illustrated in FIG. 16, consists of rotating the just formed loop about pin 13. For each full 360° revolution of the loop, the trailing end of yarn Y is wrapped once around the pin. Hence, as for example, if the yarn is to be wrapped around pin 13 twice, the loop in yarn Y is rotated about pin 13 two times.

The direction of rotation of the loop may be either clockwise or counterclockwise. FIG. 16 is illustrative of a counterclockwise rotation, as indicated by the arrows of FIG. 16. Yarn Y is shown in FIG. 16 with two passes about pin 13. It is to be understood that yarn Y may be passed around pin 13 with a single pass or a plurality of passes. The number of passes about pin 13 is determined by the number of clockwise or counterclockwise rotations of the just formed loop of yarn Y.

The next step of this method is illustrated in FIG. 17 and consists of cutting the aforementioned loop of yarn. The cut is designated as point E in FIG. 17.

As a final step in threading the spindle by this method, the knot tied with end A of yarn Y and end B–C of yarn Y is grasped and pulled away from the spindle. The strand of yarn is now wrapped around pin 13 at least one time, and the spindle is threaded.

It is to be noted that the loop as illustrated in FIG. 13 is tied in a manner such that length C–C of the yarn crosses in front of length A–B. This crossing point is indicated as intersection X. It is apparent that if the knot at point A–C had been tied such that yarn length C–D was behind yarn length A–B, a loop would still be formed around pin 13.

The manner in which the yarn crosses itself at intersection X is selected according to the type of twist that is desired to be inserted in the yarn. Two types of twist exist, know in the textile trade as "Z" twist and "S" twist. These two twists are imparted to the yarn by the rotation of the false twist spindle and the type of twist imparted is a function of the direction of rotation of the spindle. The yarn loop around the pin must be different for each of both types of twist as the rotation of the spindle in a given direction will result in entanglement of the yarn with itself with an incorrectly oriented loop.

The manner in which the yarn crosses itself at intersection X must be selected according to the twist desired, and FIGS. 20 through 25 illustrate the two alternatives possible.

FIGS. 20 through 22 are illustrative of the condition for a "Z" twist. FIG. 20 is a greatly enlarged view of tube 11 and pin 13 with yarn Y wrapped around pin 13. FIG. 21 is a view taken on line 21–21 of FIG. 20 and FIG. 22 is a top view taken on line 22–22 of FIG. 20. Note that the loop as visible in FIG. 21 corresponds to the loop visible in FIG. 13. The direction of rotation of the spindle is indicated by the arrow in FIG. 22 and the loop as threaded in FIGS. 20 through 22 is for the impartation of "Z" twist.

FIGS. 23–25 illustrate the condition necessary for "S" twist. FIG. 24 is a view taken on line 24–24 of FIG. 23 and FIG. 25 is a top view taken on line 25–25 of FIG. 23. A comparison of FIG. 24 with FIG. 21 will illustrate the different way in which the yarn crosses itself at intersection X. The direction of rotation of the spindle to produce an "S" twist is shown by the arrow in FIG. 25.

As aforementioned, with particular reference to the first described method of threading the spindle, the operator of the textile machine is able to thread the spindle with the appropriate "Z" or "S" loop simply by passing length C–D (FIG. 13) of the yarn on the appropriate side of length A–B before tying ends A and C together.

With particular reference to the second described method of threading the spindle, the operator of the textile machine is able to thread the spindle with the appropriate "Z" or "S" loop or loops simply by rotating the tied loop (formed by typing end A to end B–C) around the pin on one side or the other of the trailing end of yarn Y. FIGS. 16 through 18 are illustrative of the orientation for a "Z" twist with the trailing end in front of the tied loop. Orientation for an "S" twist would simply require the trailing end to be behind the tied loop.

As previously described, the combination of linear movement of the strand of yarn through the bore of the spindle and the rotary movement of the yarn imparted by the rotation of the spindle results in the twist being imparted on on side of the pin and simultaneously removed on the other side of the pin. With the examples shown in FIGS. 20–25, the yarn is moving linearly through bore 11 in an upward direction. With rotation shown by the arrow in FIG. 22, "Z" twist is inserted in the yarn below the pin and is indicated by the letter Z in FIG. 20. In similar manner, with the direction of rotation as indicated by the arrow in FIG. 25, "S" twist is inserted in the yarn below the pin, and is indicated by the letter S in FIG. 23.

It is apparent that a change in direction of rotation of the spindle or a change in the direction of the linear movement of the yarn will necessitate an appropriate change in the orientation of the loop, consistent with the principles above discussed.

As numerous changes and modifications may occur to the skilled worker, the form of the invention illustrated and disclosed herein should be considered as exemplary only, and scope of the invention should only be defined by the hereunto appended claims, and equivalents thereto.

Having thus described my false twist spindle and method of threading the same

I claim:

1. A spindle blade for a false twist spindle comprising a unitary blade and a twist trapping pin mounted within and transverse to the longitudinal bore through said blade and adjacent one end of said blade, said blade being characterized by the absence of any threading apertures in the region defined between the other end of said blade and a plane transverse to the axis of said bore and passing through the centerline of said twist trapping pin.

2. The apparatus of claim 1 wherein said twist trapping pin is generally cylindrically-shaped and each end of said pin is fixedly attached to said blade wall.

3. The apparatus of claim 2 wherein said blade wall has two holes passing transversely therethrough at the downstream end thereof and spaced 180° apart, and said pin ends are fixedly attached, one in each hole.

4. The apparatus of claim 1 wherein said pin is of such size as to provide a clearance space at each side of said pin between said pin and said blade, whereby there is sufficient clearance to axially insert a threading tool through said bore.

5. The apparatus of claim 4 wherein said one end of said blade has a counterbore therein of an interior diameter greater than the diameter of said bore and of such depth as to extend beyond said pin in the direction of said other end.

6. The apparatus of claim 4 wherein said one end of said blade has a notch on each side of said pin with the depth of said notch being insufficient to extend into said region.

7. The apparatus of claim 6 wherein said one end of said blade has a counterbore therein of a interior diameter greater than the diameter of said bore and of such depth as to extend beyond said pin in the direction of said other end.

8. In a false twist spindle of the kind having a hollow spindle blade mounted for rotation about its longitudinal axis, and a twist trapping pin within said hollow blade adjacent the downstream end and transverse to the longitudinal axis of the blade, the improvement comprising a unitary element blade with mounting means mounting said pin directly in the wall of said unitary element blade with said blade being characterized by the absence of any threading apertures therethrough.

9. The improvement of claim 8 wherein said downstream end of said blade has a notch on each side of said pin extending between said downstream end and said mounting means.

10. The improvement of claim 8 wherein said downstream end of said blade has a counterbore therein of such depth as to extend beyond said pin in the direction of said upstream end.

11. In a yarn false twisting apparatus, the combination comprising a unitary tube rotatable about its longitudinal axis with an axial bore therethrough, said tube having a first end and a second end, a pin extending across said bore within said tube, a zone on said wall between said first end and said second end defined between two planes passing through the surface of said pin transverse to said bore, one plane on the side of said pin facing said first end and the other plane on the side of said pin facing said second end, said zone being uninterrupted by a threading aperture providing access to said pin.

12. The apparatus of claim 11 wherein said pin is of such size as to provide a clearance space at each side of said pin between said pin and said wall, whereby there is sufficient clearance to axially insert a threading tool through said bore.

13. The method of threading a false twist spindle with a strand of yarn to be textured wherein the strand passes through an axial bore through a tube mounted for rotation about its longitudinal axis, said tube having a first end and a second end thereon, a twist trapping pin transverse to said bore, with said strand wrapped at least once around said twist trapping pin and mounting means for mounting said twist trapping pin directly to said tube between said first end and said second end and adjacent to said first end thereof, comprising passing a first end of said yarn through said bore such that said first end extends past the end of said tube and is on one side of said pin, passing a loop of said yarn through at least a portion of said bore such that said loop extends past the end of said tube and is on the other side of said pin, and tying at least a portion of the apex of said loop to said first end to form a pass of yarn around said pin.

14. The method of threading a false twist spindle with a strand of yarn to be textured wherein the strand passes through the axial bore of a hollow tube and is wrapped at least once around a twist trapping pin mounted transverse to said bore comprising passing a first end of said yarn through said bore such that said first end extends past the end of said tube and is on one side of said pin, passing a loop of said yarn through at least a portion of said bore such that said loop extends past the end of said tube and is on the other side of said pin, and tying at least a portion of the apex of said loop to said first end to form a pass of yarn around said pin.

15. The method of threading a false twist spindle with a strand of yarn to be textured wherein the strand passes through the axial bore of a spindle blade and is wrapped at least once around a twist trapping pin mounted transverse to said bore comprising passing a first end of said yarn through said bore such that said first end extends past the end of said blade and is on one side of said pin, passing a loop of said yarn through at least a portion of said bore such that said loop extends past the end of said blade and is on the other side of said pin, parting the yarn of said loop to form a second end of said yarn strand and a third end of said yarn strand, with said third end being an end of said strand that passes through the entire axial length of said blade, and tying said third end to said first end thereby forming a pass of yarn that encircles said pin.

16. The method of claim 15 wherein said passing of said first end and said passing of said loop is performed with a fine wire hook passed through said axial bore.

17. The method of claim 15 wherein a further loop may be passed through said bore and parted to form a fourth end and a fifth end, with said fifth end being an end of said strand that passes through the entire axial length of said blade, and tying said fifth end to said second end thereby forming a second pass of yarn around said pin.

18. The method of threading a false twist spindle with a strand of yarn to be textured wherein the strand passes through the axial bore of a hollow tube and is wrapped at least once around a twist trapping pin mounted transverse to said bore comprising passing a first end of said yarn through said bore such that said first end extends past the end of said tube and is on one side of said pin, passing a loop of said yarn through at least a portion of said bore such that said loop extends past the end of said tube and is on the other side of said pin, tying the apex of said loop to said first end thereby forming a tied loop of yarn about said pin, rotating said tied loop about said pin at least one revolution, and then parting said tied loop thereby forming at least one pass of yarn that encircles said pin.

Disclaimer 3,574,273.—*Richard G. Hilbert*, Esmond, R.I. FALSE TWIST SPINDLE AND METHOD OF THREADING THE SAME. Patent dated Apr. 13, 1971. Disclaimer filed Aug. 17, 1971, by the assignee, *Leesona Corporation*.

Hereby enters this disclaimer to claims 1, 2, 4, 8, 11 and 12 of said patent.
[*Official Gazette November 23, 1971.*]